(12) United States Patent
Chung et al.

(10) Patent No.: US 11,567,250 B2
(45) Date of Patent: Jan. 31, 2023

(54) NEAR-INFRARED RAY ABSORBING ARTICLE AND METHOD FOR MANUFACTURING THEREOF, AND OPTICAL FILTER AND METHOD FOR MANUFACTURING THEREOF

(71) Applicant: LMS Co., Ltd., Pyeongtaek-si (KR)

(72) Inventors: Jinyoung Chung, Pyeongtaek-si (KR); Seonho Yang, Pyeongtaek-si (KR); Taekwang Park, Pyeongtaek-si (KR); Namwoo Kang, Pyeongtaek-si (KR); Sunghwan Moon, Pyeongtaek-si (KR); Seungman Han, Pyeongtaek-si (KR); Hoseong Na, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 215 days.

(21) Appl. No.: 16/733,788

(22) Filed: Jan. 3, 2020

(65) Prior Publication Data

US 2020/0218000 A1    Jul. 9, 2020

(30) Foreign Application Priority Data

Jan. 3, 2019 (KR) .................. 10-2019-0000498
Dec. 20, 2019 (KR) .................. 10-2019-0172134

(51) Int. Cl.
  *G02B 5/28*   (2006.01)
  *G02B 5/22*   (2006.01)
  *G02B 5/20*   (2006.01)
  *G02B 5/08*   (2006.01)

(52) U.S. Cl.
  CPC ............. *G02B 5/281* (2013.01); *G02B 5/208* (2013.01); *G02B 5/22* (2013.01); *G02B 5/285* (2013.01); *G02B 5/0858* (2013.01)

(58) Field of Classification Search
  None
  See application file for complete search history.

(56) References Cited

U.S. PATENT DOCUMENTS

| 2016/0139308 | A1* | 5/2016 | Kim .................. H01L 27/14625 359/359 |
| 2016/0318796 | A1 | 11/2016 | Masuda |
| 2019/0094429 | A1 | 3/2019 | Park et al. |
| 2019/0179066 | A1* | 6/2019 | Park ..................... C03C 21/002 |
| 2019/0219749 | A1* | 7/2019 | Shimmo ................. G02B 5/26 |

(Continued)

FOREIGN PATENT DOCUMENTS

| CN | 105764863 A | 7/2016 |
| KR | 10-2009-0051250 A | 5/2009 |
| KR | 10-1892941 B1 | 8/2018 |

OTHER PUBLICATIONS

Chinese Office Action dated Sep. 15, 2021, in connection with the Chinese Patent Application No. 202010004901.3 citing the above reference(s).

*Primary Examiner* — Derek S. Chapel
(74) *Attorney, Agent, or Firm* — Hauptman Ham, LLP

(57) ABSTRACT

The present invention relates to a near-infrared absorbing article and an optical filter utilizing the same, wherein the near-infrared absorbing article comprises a glass substrate including a compressive stress layer having a predetermined thickness, thus to provide a thin thickness and a certain level of strength or more. Therefore, it has an advantage that can be cut by using a blade or a laser.

6 Claims, 2 Drawing Sheets

(56) References Cited

U.S. PATENT DOCUMENTS

2020/0207658 A1\* 7/2020 Park .................... C03C 17/3411
2021/0191013 A1\* 6/2021 Moon .................... G02B 5/003
2021/0382213 A1\* 12/2021 Moon .................... G02B 5/003

\* cited by examiner ved,<br>
NEAR-INFRARED RAY ABSORBING ARTICLE AND METHOD FOR MANUFACTURING THEREOF, AND OPTICAL FILTER AND METHOD FOR MANUFACTURING THEREOF

CROSS REFERENCE TO RELATED APPLICATION

This application claims priority under 35 U.S.C. 119 to Korean Patent Application No. 10-2019-0000498, filed on Jan. 3, 2019, and Korean Patent Application No. 10-2019-0172134, filed on Dec. 20, 2019, the entire disclosure of each of which is herein incorporated by reference in its entirety.

BACKGROUND

Technical Field

The present invention relates to a near-infrared absorbing article and an optical filter comprising the same.

Description of Related Art

Recently, the demand for digital camera modules using image sensors has increased significantly due to the expansion of smartphones and tablet PCs. The development direction of the digital camera module used in such a mobile device is to develop toward the thinner with providing higher resolution.

The image signal of the digital camera module is received through the image sensor. Unlike the human eye, an image sensor made of a semiconductor responds to wavelengths in the infrared region. Therefore, an IR cut-off filter that cuts the wavelength of the infrared region is required to obtain image information similar to that of the human eye.

This infrared cut-off filter in the low pixel of no more than 2 million pixels is consisted of a combination of an anti-reflection coating layer (AR Coating Layer) mainly repeated lamination of metal oxide on both sides of the glass material and the infrared coating layer (IR Coating Layer). However, the AR Coating Layer where the metal oxides are repeatedly stacked and the IR Coating Layer have a large change in spectral characteristics depending on the incident angle of light. The digital camera modules, meanwhile, are tend to have higher pixel numbers for the image sensors. For the structure of the digital camera module employing such a high pixel image sensor, the change in the spectral characteristics according to the incident angle becomes large, and as a result, the quality of the image is deteriorated. To minimize this problem, a structure employing an infrared cut-off filter containing a compound (also called an "infrared absorber" or "light absorber") capable of absorbing light in the infrared region is used.

In the case of an infrared cut-off filter containing a light absorbing agent, a filter having a structure of a combination of an anti-reflection coating layer repeatedly laminated metal oxide and the infrared coating layer on both surfaces of a substrate containing an absorbent (referred to as "blue glass") is used. In the process of manufacturing the blue glass to have an applicable the thickness for the infrared cut-off filter, it is difficult to manufacture a filter having a thickness of 0.2 mm or less due to the limitation of the process thereby there is a limit to make a thin infrared cut-off filter with the blue glass. Accordingly, there is still a demand for the development of a thin optical filter (e.g., having a thickness of 0.2 mm or less) while absorbing near infrared rays.

SUMMARY

The present invention has an object to provide a near-infrared absorbing article and an optical filter comprising the same by utilizing a glass substrate which is thinner and has a superior strength over the conventional 0.21 mm thick blue glass optical filter while it is easily prepared by a conventional method (such as cutting).

To achieve the above object, the present invention provides a near-infrared absorbing article comprising a glass substrate and a light absorbing layer formed on one side or both sides of the glass substrate, wherein the glass substrate comprises a first compressive stress layer formed on a first main surface of the glass substrate and a second compressive stress layer formed on a second main surface opposite to the first main surface of the glass substrate, an average thickness of the glass substrate is 0.07 mm to 0.12 mm, and a three-point bending strength of the near-infrared absorbing article is 360 MPa or more when the glass substrate is measured with reference to the standard ASTM D790.

To achieve the further object, the present invention provides the near-infrared absorbing article, wherein a combined average thickness of a thickness of the glass substrate and a thickness of the light absorbing layer is in a range of 0.08 mm to 0.15 mm.

To achieve the further object, the present invention provides the near-infrared absorbing article, wherein an average thickness of the first compressive stress layer and an average thickness of the second compressive stress layerare in a range of 1 µm to 30 µm, respectively.

To achieve the further object, the present invention provides the near-infrared absorbing article, wherein an average thickness of the light absorbing layer is in a range of 0.5 µm to 10 µm.

To achieve the further object, the present invention provides the near-infrared absorbing article further comprising an adhesive layer between the glass substrate and the light absorbing layer.

To achieve another object, the present invention provides the an optical filter comprising the near-infrared absorbing article including a glass substrate and a light absorbing layer formed on one side or both sides of the glass substrate, and a selective wavelength reflecting layer formed on one or both sides of the near-infrared absorbing article, wherein the glass substrate comprises a first compressive stress layer formed on a first main surface of the glass substrate and a second compressive stress layer formed on a second main surface opposite to the first main surface of the glass substrate, wherein an average thickness of the glass substrate is 0.07 mm to 0.12 mm and wherein a three-point bending strength of the near-infrared absorbing article is 360 MPa or more when the glass substrate is measured with reference to the standard ASTM D790.

To achieve another object, the present invention provides the optical filter further comprising a dielectric multilayer film formed to construct the selective wavelength reflecting layer.

To achieve another object, the present invention provides the an optical filter comprising a dielectric film having a refractive index of 1.4 to 1.6 and a dielectric film having a refractive index of 2.1 to 2.5, wherein the dielectric film having a refractive index of 1.4 to 1.6 and the dielectric film having a refractive index of 2.1 to 2.5 are alternately stacked to construct the selective wavelength reflecting layer.

To achieve still another object, the present invention provides the method for manufacturing a near-infrared absorbing article comprising the steps of forming a first compressive stress layer and a second compressive stress layer on a glass substrate by dipping the glass substrate in a solution containing alkali metal ions and then a heat-treatment to form the first compressive stress layer and the second compressive stress layer on the glass substrate, and forming a light absorbing layer on one or both surfaces of the glass substrate on which the first compressive stress layer and the second compressive stress layer are formed.

To achieve still another object, the present invention provides the method for manufacturing the near-infrared absorbing article, wherein the forming a first compressive stress layer and a second compressive stress layer comprises performing a heat treatment for 5 minutes to 70 minutes at a temperature in the range of 350° C. to 450° C.

To achieve still another object, the present invention provides the method for manufacturing the near-infrared absorbing article, wherein the forming the light absorbing layer comprises applying a forming composition for forming the light absorbing layer comprising at least one light absorbing agent to the one or both surfaces of the glass substrate on which the first compressive stress layer and the second compressive stress layer are formed; and then performing a heat treatment, wherein the forming the light absorbing layer comprises performing the heat treatment for 2 hours to 5 hours at a temperature in the range of 100° C. to 160° C. for forming the light absorbing layer.

To achieve still another object, the present invention provides the method for manufacturing the near-infrared absorbing article further comprising: forming an adhesive layer before forming the light absorbing layer, wherein the forming the adhesive layer comprises applying a resin composition to the one or both surfaces of the glass substrate on which the first compressive stress layer and the second compressive stress layer are formed, and then performing a heat treatment, wherein the performing the heat treatment comprises performing the heat treatment for 5 minutes to 30 minutes in a temperature range of 120° C. to 160° C. for forming the adhesive layer.

To achieve yet another object, the present invention provides the method for manufacturing an optical filter comprising: forming a first compressive stress layer and a second compressive stress layer on a glass substrate by dipping the glass substrate in a solution containing alkali metal ions and then a heat-treatment to form the first compressive stress layer and second compressive stress layer on the glass substrate and forming a light absorbing layer on one surface or both surfaces of the glass substrate on which the first compressive stress layer and the second compressive stress layer are formed to manufacture a near-infrared absorbing article, and forming a selective wavelength reflecting layer on the one surface or both surfaces of the near-infrared absorbing article.

To achieve yet another object, the present invention provides the method for manufacturing the optical filter further comprising: forming a dielectric multilayer film on one surface or both surfaces of the near infrared absorbing article for forming the selective wavelength reflecting layer.

To achieve yet another object, the present invention provides the method for manufacturing the optical filter further comprising: forming a dielectric film having a refractive index in the range of 1.4 to 1.6 and a dielectric film having a refractive index in the range of 2.1 to 2.5 being alternately stacked on the one surface or both surfaces of the near infrared absorbing article for forming the selective wavelength reflecting layer.

DETAILED DESCRIPTION

Figure 1:
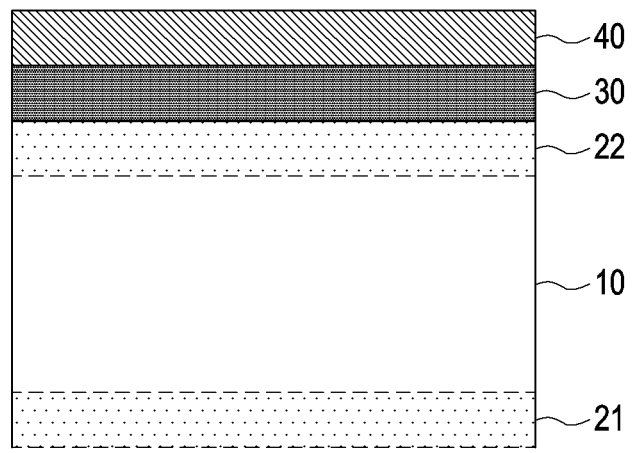
FIG. 1 is a cross-sectional view showing the structure of one embodiment of the near-infrared absorbing article of the present invention.

As the invention allows for various changes and numerous embodiments, particular embodiments will be illustrated in the drawings and described in detail in the written description. However, this is not intended to limit the present invention to specific embodiments, it should be understood to include all modifications, equivalents, and substitutes included in the spirit and scope of the present invention.

In the present invention, the terms "comprising" or "having" are intended to indicate that there is a feature, number, step, operation, component, part, or combination thereof described in the specification, and one or more other features. It is to be understood that the present invention does not exclude the possibility of the presence or the addition of numbers, steps, operations, components, components, or a combination.

In addition, it is to be understood that the accompanying drawings in the present invention are shown to be enlarged or reduced for convenience of description.

The present invention will be described in detail with reference to the accompanying drawings, and the same or corresponding components will be given the same reference numerals regardless of the reference numerals, and redundant description will be omitted.

The present invention relates to a near-infrared absorbing article containing a glass substrate including a compressive stress layer and an optical filter comprising the same.

Below, the present invention will be described in more detail.

Near-Infrared Absorbing Article

The present invention in one embodiment provides a near-infrared absorbing article comprises a glass substrate and a light absorbing layer formed on one or both surfaces of the substrate wherein the glass substrate comprises a first compressive stress layer formed on a first main surface and a second compressive stress layer formed on a second main surface opposite to the first main surface. The glass substrate has an average thickness of 0.07 mm to 0.12 mm and the near-infrared absorbing article is provided with a bending strength of 360 MPa or more when the three-point bending strength is measured with reference to the standard ASTM D790. Herein, the standard ASTM D790 is standard test methods for flexural properties of unreinforced and reinforced plastics and electrical insulating materials.

In one example, each of the first compressive stress layer and the second compressive stress layer may be formed in a direction toward the inside of the glass substrate.

As one example, the combined average thickness of the glass substrate and the light absorbing layer may be in the range of 0.08 mm to 0.15 mm. The thickness may, in another example, be in the range of 0.08 mm to 0.14 mm, 0.09 mm to 0.135 mm, 0.10 mm to 0.13 mm, 0.08 mm to 0.125 mm, 0.095 mm to 0.12 mm or 0.11 mm to 0.13 mm. More specifically, the thickness may be in the range of 0.10 mm to 0.12 mm.

FIG. 1 is a cross-sectional view showing the structure of a near-infrared absorbing article according to the present invention. Referring to FIG. 1, the near-infrared absorbing article includes glass substrates 10, 21, 22 and a light absorbing layer 40, wherein the glass substrate 10, 21, 22 comprises a first compressive stress layer 21 formed on a first main surface of the glass substrate 10 and a second compressive stress layer 22 formed on a second main surface of the glass substrate 10 which is opposite to the first main surface. The first and second compressive stress layers 21, 22 may be formed in a direction toward the inside of the glass substrate 10.

In addition, the near-infrared absorbing article may further include an adhesive layer 30 existing between the glass substrate 10 and the light absorbing layer 40, wherein the adhesive layer 30 and the light absorbing layer 40 may be sequentially stacked on one side of the glass substrate 10 while the first and second compressive stress layers 21, 22 are formed on both sides.

As one example, the glass substrate 10, 21, 22, specifically, the glass substrate 10 on which the first and second compressive stress layers 21, 22 are formed, may have a three-point bending strength of 360 MPa or more, measured with reference to the standard ASTM D790. The three-point bending strength of the glass substrate 10, 21, 22 may, in another example, be at least 360 MPa, at least 370 MPa, at least 390 MPa, at least 400 MPa, at least 440 MPa, at least 500 MPa, 370 MPa to 700 MPa, 390 MPa to 600 MPa or 390 MPa to 550 MPa. More specifically, the three-point bending strength measured based on ASTM D790 of the glass substrate 10 on which the first and second compressive stress layers 21, 22 are formed may be 450 MPa to 600 MPa in another example.

Below, each component constituting the near-infrared absorbing article according to the present invention will be described in more detail.

First, the glass substrate, 10, 21, 22 used in the present invention is a substrate including a first compressive stress layer 21 formed on the first main surface and a second compressive stress layer 22 formed on the second main surface which is the opposite to the first main surface of the glass substrate 10. There is an advantage that after-process (cutting) is easy because the glass is thin enough to be cut while maintaining appropriate strength.

As one example, the average thickness of the glass substrate 10, 21, 22 is in the range of 0.07 mm to 0.12 mm. Specifically, the average thickness of the glass substrate 10, 21, 22 may be 0.07 mm to 0.115 mm, 0.08 mm to 0.115 mm, 0.09 mm to 0.11 mm, 0.07 mm to 0.09 mm, 0.10 mm to 0.11 mm, or 0.09 mm to 0.11 mm. More specifically, the average thickness of the glass substrate 10, 21, 22 may be 0.10 mm to 0.11 mm.

In addition, the compressive stress layers 21, 22 is a layer formed by replacing Na $^+$ions contained in the existing glass substrate 10 with K $^+$ions through a chemical strengthening process. In this process, a compressive stress layer 21, 22 is defined as a layer where K $^+$ions substitute in a direction parallel to the thickness direction of the substrate from one surface of the glass substrate 10, specifically, from one surface of the glass substrate 10 toward the center of the substrate. Such layer is generally stated as DOL (depth of compressive stress layer).

The thickness of the compressive stress layer 21, 22 (DOL) can be obtained by photoelastic analysis using the refractometer method. In addition, the thickness of the compressive stress layer 21, 22 may be obtained by a commercially available surface stress meter. In the present invention, it was measured using a surface stress measuring instrument (model name FSM-6000LE) of Orihara Industrial Co., Ltd., Japan, and the light source used for the measurement was an LED light source having a center wavelength of 595 nm (±10 nm).

For example, the compressive stress layer 21, 22 formed on the glass substrate 10, 21, 22 may be formed in the range of 30% or less of the thickness of the near-infrared absorbing article. For example, the average thickness of each of the first and second compressive stress layers 21, 22 formed on the glass substrate 10, 21, 22 may be between 1 μm and 30 μm. The thickness is, in another example, 5 μm to 30 μm, 5 μm to 25 μm, 5 μm to 20 μm, 5 μm to 15 μm, 5 μm to 10 μm, 10 μm to 30 μm, 10 μm to 25 μm, 10 μm to 20 μm, 10 μm to 15 μm, 15 μm to 30 μm, 15 μm to 25 μm or 15 μm to 20 μm. More specifically, the average thickness of the first and second compressive stress layers 21, 22 may be independently 15 μm to 18 μm range. Within the thickness range of the compressive stress layers 21, 22, it is possible to provide a glass substrate 10, 21, 22 having excellent strength and easy processing such as cutting and thinning of the near-infrared absorbing article.

Next, the light absorbing layer 40 used in the present invention is a layer including a light absorbing agent, and serves to absorb light in the near-infrared wavelength region in the near-infrared absorbing article.

Here, the light absorbing layer 40 may be formed on one or both surfaces of the glass substrate 10, 21, 22 as described above. Specifically, the light absorbing layer 40 may be formed on one surface on which the compressive stress layer 21 22 is formed on the glass substrate 10.

The light absorbing layer 40 may have a form in which the light absorbing agent is dispersed in the resin, or may have a form in which the light absorbing agent is coated on one or both surfaces of the glass substrate 10, 21, 22. At this time, the light absorbing agent may be used in a uniformly mixed form. In the present invention, a plurality of light absorbers of different types may be applied to the light absorbing layer and when the light absorbing agent is included in the light absorbing layer 40 or has a form dispersed on a glass substrate 10, 21, 22, the plurality of light absorbing agents may be present in a uniformly dispersed form. In addition, when the light absorbing layer is formed on both surfaces of the glass substrate 10, 21, 22 to form a light absorbing layer, different light absorbing agents may be applied to the light absorbing layers formed on both surfaces of the glass substrate 10, 21, 22.

In the case where the light absorbing layer 40 has a resin and a light absorbing agent dispersed in the resin, the kind of the resin forming the light absorbing layer 40 is not particularly limited. As for the resin, for example, at least one of resins such as cyclic olefin resin, polyarylate resin, polysulfone resin, polyether sulfone resin, polyparaphenylene resin, polyarylene ether phosphine oxide resin, polyimide resin, polyetherimide, polyamideimide resins, acrylic resins, polycarbonate resins, polyethylene naphthalate resins, and various organic-inorganic hybrid series resins may be used.

In this case, the light absorbing agent of the light absorbing layer 40 may be a dye, a pigment and/or a metal complex compound that absorbs light in a specific wavelength region and a dye that exhibits heat resistance and is not affected by heat treatment conditions.

In addition, the light absorbing agent may be used one or more of various kinds of dyes, pigments or metal complex compounds and it is not particularly limited. For example, they van be cyanine compounds, phthalocyanine compounds, naphthalocyanine compounds, porphyrin compounds, benzoporphyrin compounds, squarylium compounds, anthraquinone compounds, croconium compounds, dimonium compounds, dithiol metal complexes and so on. The light absorbing agent may be used alone, and in some cases, may be used by mixing two or more kinds or separated into two layers.

The content of the light absorbing agent is, for example, based on 100 parts by weight of the resin, 0.001 parts by weight to 10 parts by weight, 0.001 parts by weight to 5 parts by weight, 0.01 parts by weight to 10 parts by weight, 0.01 parts by weight to 5 parts by weight or 0.5 parts by weight to 5 parts by weight. Within the content range of the light absorbing agent, a shift phenomenon of the transmission spectrum according to the incident angle of light incident on the near-infrared absorbing article may be corrected, and an excellent near infrared blocking effect may be realized.

As one example, the average thickness of the light absorbing layer 40 may be in the range of 0.5 µm to 10 µm. Specifically, the average thickness of the light absorbing layer 40 may be in the range of 0.5 µm to 10 µm, 0.5 µm to 8 µm, 0.5 µm to 5 µm, 0.5 µm to 3 µm, 1 µm to 10 µm, 1 µm to 8 µm or 1 µm to 5 µm. More specifically, the average thickness of the light absorbing layer 40 may be 1 µm to 5 µm. A thin near-infrared absorbing article having excellent strength within the thickness range of the light absorbing layer 40 can be realized.

The near-infrared absorbing article of the present invention may further include an adhesive layer 30 between the glass substrate 10, 21, 22 and the light absorbing layer 40. Specifically, the near-infrared absorbing article of the present invention may further include an adhesive layer 30 between one surface of the glass substrate 10, 21, 22 on which the compressive stress layer 22 is formed and the light absorbing layer 40. More specifically, the near-infrared absorbing article may further include an adhesive layer 30 between the surface of the glass substrate 10, 21, 22 on which the first compressive stress layer 21 and/or the second compressive stress layer 22 are formed and the light absorbing layer 40.

The kind of resin which forms the adhesive layer 30 is not specifically limited. For example, one or more types of cyclic olefin resin, polyarylate resin, polyisocyanate resin, polyimide resin, polyetherimide resin, polyamideimide resin, acrylic resin, poly carbonate resin, polyethylene naphthalate resin and polyacrylate resin can be used.

Optical Filter

In another embodiment, the present invention provides an optical filter including the near-infrared absorbing article.

As one example, the optical filter according to the present invention includes the above-described near-infrared absorbing article and the selective wavelength reflecting layer formed on one or both surfaces of the near-infrared absorbing article.

Figure 2:
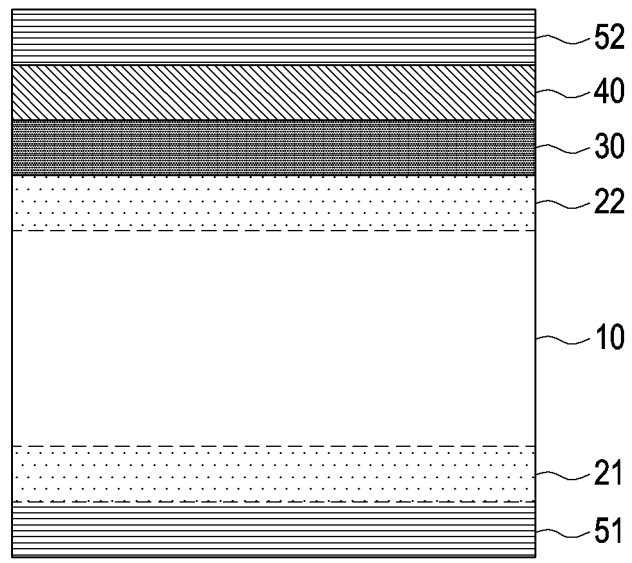
FIG. 2 is a cross-sectional view showing the structure of one embodiment of an optical filter of the present invention.

FIG. 2 is a cross-sectional view showing the structure of an optical filter according to the present invention. In FIG. 2, the optical filter according to the present invention comprises a glass substrate 10, 21, 22, a light absorbing layer 40, a selective wavelength reflecting layer 51 or 52, an adhesive layer 30 between the glass substrate 10, 21, 22 and the light absorbing layer 40 and a first and a second compressive stress layers 21 and 22 wherein the are formed on both sides of the glass substrate 10, 21, 22.

Below, each component of the optical filter according to the present invention will be described in more detail with reference to FIG. 2.

First, in the optical filter according to the present invention, the glass substrate 10, 21, 22 serves as a base substrate of the optical filter. As described above, since the glass substrate 10, 21, 22 includes the first and second compressive stress layers 21, 22 on both surfaces of the glass substrate 10, 21, 22, the glass substrate 10, 21, 22 may have excellent strength even when thinned, and may be easily processed (such as cutting, etc.).

In the above description, the selective wavelength reflecting layer 51, 52 refers to a functional layer capable of selectively blocking specific wavelengths and/or preventing specific wavelengths from being reflected. Specifically, since the optical filter of the present invention may be a near-infrared cut-off filter, the selective wavelength reflecting layer 51, 52 may reflect light in the near-infrared wavelength band, for example, light of any wavelength within the range of 650 nm or more, specifically 700 nm to 1,200 nm and thus to prevent transmission of the light through the optical filter. Or, it may be a layer to prevent reflection of visible light wavelength band, for example, light of any wavelength within the range of 400 nm to 650 nm. Therefore, the selective wavelength reflecting layer 51, 52 may serve as a near-infrared reflecting layer that reflects near infrared rays and/or as an anti-visible light reflecting layer that preventing the visible light reflection. In this case, the selective wavelength reflecting layer 51, 51 may have a structure such as a dielectric multilayer film in which a high refractive index layer and a low refractive index layer are alternately stacked, and it may further include an aluminum deposition film, precious metal thin film or a resin film in which one or more fine particles of indium oxide and tin oxide are dispersed. For example, the selective wavelength reflecting layer 51, 52 may have a structure in which a dielectric multilayer film having a first refractive index and a dielectric multilayer film having a second refractive index are alternately stacked, and the refractive index deviation of the dielectric multilayer film having the first refractive index and a dielectric multilayer film having a second refractive index may be 0.2 or more, 0.3 or more, 0.4 or more, 0.5 or more, 0.2 to 1.5, 0.2 to 1.0, 0.5 to 1.5 or 0.5 to 1.0.

Furthermore, the high refractive index layer and the low refractive index layer of the selective wavelength reflecting layer 51, 52 is not particularly limited as long as the refractive index deviation of the high refractive index layer and the low refractive index layer is included in the above-described range, but, specifically, the high refractive index layer may include one or more selected from a group consisting of titanium dioxide, aluminum oxide, zirconium oxide, tantalum pentoxide, niobium pentoxide, lanthanum oxide, yttrium oxide, zinc oxide, zinc sulfide and indium oxide having a refractive index of 2.1 to 2.5. The indium oxide may further contain a small amount of titanium dioxide, tin oxide, cerium oxide, etc. In addition, the low refractive index layer may include at least one member selected from a group consisting of silicon dioxide, lanthanum fluoride, magnesium fluoride, and sodium hexafluoride (Cryolite, $Na_3AlF_6$) having a refractive index of 1.4 to 1.6. The reference wavelength of the refractive index may be about 550 nm.

Furthermore, the selective wavelength reflecting layer 51, 52 may be formed on one surface of the near-infrared absorbing article and in some cases, a first and second selective wavelength reflecting layers may be formed on both surfaces of the near-infrared absorbing article.

Method for Manufacturing a Near-Infrared Absorbing Article

The present invention also relates to a method for manufacturing the near-infrared absorbing article.

Specifically, the method for manufacturing a near-infrared absorbing article of the present invention comprises the steps of dipping the glass substrate in a solution containing alkali metal ions and then heat-treating to form first and second compressive stress layers and forming a light absorbing layer on one or both surfaces of the glass substrate on which the first and second compressive stress layers are formed.

The forming of the first and second compressive stress layers may be performed by chemically strengthening the glass substrate. In the method of the present invention, the glass substrate is dipped in a solution containing alkali metal ions, for example, K $^+$ ions for forming the first and second compressive stress layers, and then heat-treated under predetermined conditions.

Specifically, the method of the present invention may be performed for 5 minutes to 70 minutes at a temperature range of 350° C. to 450° C. for forming the first and second compressive stress layer. Specifically, the heat treatment can be performed at the temperature within the range of 350° C. to 450° C., 380° C. to 420° C., 380° C. to 410° C. or 385° C. to 400° C. In addition, the heat treatment can be performed for 5 minutes to 70 minutes, 5 minutes to 60 minutes, 5 minutes to 50 minutes, 10 minutes to 70 minutes, 10 minutes to 60 minutes, 10 minutes to 50 minutes, 20 minutes to 70 minutes or 30 minutes to 70 minutes.

The method of the present invention further includes forming a light absorbing layer 40 on one or both surfaces of the glass substrate 10, 21, 22 on which the first and second compressive stress layers 21, 22 are formed. Specifically, in the step of forming the light absorbing layer 40, a composition for forming a light absorbing layer 40 comprising at least one or more light absorbing agents is applied to one or both surfaces of the glass substrate 10, 21, 22 on which the first and second compressive stress layers 21, 22 are formed, and then heat treatment can be performed.

The composition for forming a light absorbing layer may further include a resin capable of dispersing the light absorbing agent(s) together with at least one light absorbing agent as described above. The kind of the resin is not limited. Examples of the resin may include cyclic olefin resins, polyarylate resins, polysulfone resins, polyether sulfone resins, polyparaphenylene resins, polyarylene ether phosphine oxide resins, polyimide resins, and polyetherimide resins, and one or more selected from polyamideimide resin, acrylic resin, polycarbonate resin, polyethylene naphthalate resin, and various organic-inorganic hybrid series resins.

Manufacturing conditions for forming the light absorbing layer 40 may also be adjusted. The present invention may be performed at a temperature in the range of 100° C. to 160° C. for forming the light absorbing layer 40. The heat treatment temperature may be in the range of 110° C. to 150° C., 120° C. to 130° C. or 130° C. to 150° C. In addition, the heat treatment time may also be appropriately adjusted. For example, the method of the present invention may be performed for 2 hours to 5 hours, 3 hours to 5 hours, 4 hours to 5 hours or 3 hours to 4 hours for forming the light absorbing layer 40.

The method of the present invention may further include forming an adhesive layer 30 between the glass substrate 10, 21, 22 on which the first and second compressive stress layers 21, 22 are formed and the light absorbing layer 40. Specifically, the method may further include forming an adhesive layer 30 before forming the light absorbing layer 40.

For the method of the present invention, the heat treatment may be performed after applying the resin composition on one or both surfaces of the glass substrate 10, 21, 22 on which the first and second compressive stress layers 21, 22 are formed for forming the adhesive layer 30. The resin composition may be a so-called adhesive composition. The adhesive composition may mainly include an adhesive resin.

The kind of adhesive resin used for the adhesive composition is not specifically limited, and for example, one or more of cyclic olefin resin, polyarylate resin, polyisocyanate resin, polyimide resin, polyetherimide resin, polyamideimide resin, acrylic, polycarbonate resin, polyethylene naphthalate resin, and polyacrylate resin can be used. The method of the present invention can adjust the heat treatment condition for forming the adhesive layer 30. Specifically, the heat treatment may be performed within a temperature range of 120° C. to 160° C. for forming the adhesive layer. In another example, the heat treatment can be performed within a temperature range of 120° C. to 155° C., 130° C. to 150° C., or 145° C. to 155° C. In addition, in the method of the present invention for forming the adhesive layer 30, the heat treatment can be done for 5 minutes to 30 minutes, for 5 minutes to 20 minutes, for 5 minutes to 15 minutes, for 10 minutes to 30 minutes, for 10 minutes to 20 minutes, for 15 minutes to 30 minutes or for 15 minutes to 20 minutes.

The present invention also relates to a method for manufacturing an optical filter. Specifically, the present invention relates to a method for manufacturing an infrared cut-off filter, or a near-infrared cut-off filter.

The method of manufacturing an optical filter of the present invention includes manufacturing a near-infrared absorbing article according to the above stated method, and forming a selective wavelength reflection layer 51, 52 on at least one surface of the near-infrared absorbing article.

Therefore, the manufacturing method of the optical filter of the present invention comprises the steps of preparing a near-infrared absorbing article according to the method stated above, and forming a selective wavelength reflecting layer 51, 52 on one or both surfaces of the near-infrared absorbing article.

The method may form a dielectric multilayer film on one surface or both surfaces of the near-infrared absorbing article in the step of forming the selective wavelength reflection layer 51, 52.

Specifically, for forming the selective wavelength reflecting layer 51, 52, the low refractive index layer and the high refractive index layer may be alternately stacked on one surface or both surfaces of the near-infrared absorbing article. Specifically, the high refractive index layer may be a dielectric film having a refractive index in the range of 2.1 to 2.5 or 2.2 to 2.4. In addition, the low refractive index layer may be a dielectric film having a refractive index in the range of 1.4 to 1.6 or 1.45 to 1.6. Each of the dielectric films may be a dielectric multilayer film. The reference wavelength of the refractive index may be about 550 nm.

Below, the optical filter of the new structure according to the present invention will be described in detail through specific embodiments of the present invention. The embodiments exemplified below are only for the detailed description of the present invention, and are not intended to limit the scope of the rights.

1. Measurement of Three-Point Bending Strength

Figure 3:
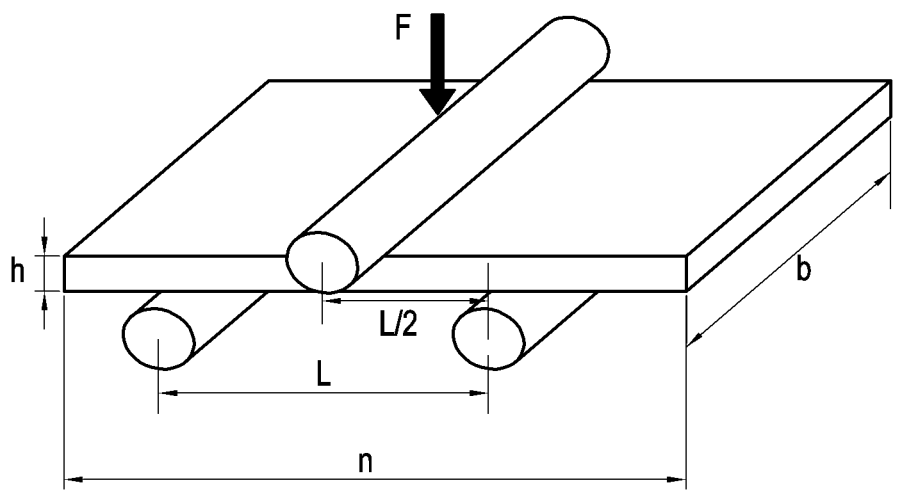
FIG. 3 is a schematic diagram of a process of measuring bending strength.

Three-point bending strength of the specimens for Preparation Examples, Examples, and Comparative Examples was measured with referenced to the standard ASTM D790. Specifically, as shown in FIG. 3, a test specimen is prepared, and a three-point bending strength (unit: MPa) is measured by substituting a set value and a measured value (break load when the specimen is broken, F) into Equation 1:

1. Equation 1

$$\sigma_f = (3 \times F \times L)/(2 \times b \times H^2)$$

In Equation 1, $\sigma_f$ is the fracture stress (three-point bending strength) of the specimen, F is the breaking load (unit: N) applied to the specimen, L is the distance between supporting rods for supporting the specimen which is 5.5 mm, b is the width of the specimen which is 6 mm, and H is the thickness of the specimen which is 0.117 mm 2. Check Whether the Glass Substrate is Cut The specimen was checked whether the glass substrates for Preparation Examples 1 to 9, Reference Example 1 and Comparative Example 1 are possible to be cut by using a blade or a laser, and then the specimen was evaluated by marking "O" if it is possible being cut and marking "X" if not.

Preparation Example 1: Preparation of Tempered Glass Substrate

The tempered glass substrate was prepared by the following procedure:

(1) A glass substrate (AS87, Schott, Inc.) was washed with a nanostrip (Nano-strip, Cyantek, Inc.) to prepare a 0.1 mm thick glass substrate.

(2) The glass substrate is placed in a potassium nitrate melt solution, and the potassium nitrate melt solution containing the glass substrate is heat-treated at a temperature of 390° C. for 10 minutes to form first and second compressive stress layers 21, 22 on both surfaces of the glass substrate.

Preparation Examples 2 to 9: Preparation of Tempered Glass Substrate 10, 21, 22

In the step (2), the tempered glass substrate 10, 21, 22 was prepared in the same manner as in Preparation Example 1, except that the treatment time of the melt solution containing the glass substrate 10, 21, 22 was adjusted as shown in Table 1 below. In addition, the glass substrates 10, 21, 22 of Preparation Examples 1 to 9, Reference Example 1, and Comparative Example 1 confirmed the results of cutting, and the measurement results of the bending strengths are shown in Table 1 below. The relative value of bending strength in Table 1 below is a percentage of the measured bending strength relative to the bending strength of the glass substrate 10, 21, 22 of Reference Example 1. In addition, the thickness of a compressive stress layer in Table 1 is the thickness of one compressive stress layer formed in the glass substrate 10, 21, 22. Comparative Example 1 is commercial glass (Registered Trademark Willow glass, Corning Co., Ltd.) of 0.1 mm in thickness, and Reference Example 1 is a blue glass (product name QB64, product name Qingdao Co., Ltd.) of 0.21 mm in thickness.

TABLE 1

| Division | Reinforcing condition | | Thickness of compressive stress layer | Cutting | | Bending strength | |
|---|---|---|---|---|---|---|---|
| | Temperature(° C.) | Time(minute) | | Blade | Laser | Absolute value (MPa) | Relative value (%) |
| Reference Example 1 | — | — | — | O | O | 368 | 100 |
| Comparative Example 1 | — | — | — | O | O | 308 | 84 |
| Preparation Example 1 | 390 | 10 | 6.3 | O | O | 379 | 103 |
| Preparation Example 2 | 390 | 20 | 9.9 | O | O | 393 | 107 |
| Preparation Example 3 | 390 | 30 | 13.8 | X | O | 446 | 121 |
| Preparation Example 4 | 390 | 40 | 17.5 | X | O | 511 | 139 |
| Preparation Example 5 | 390 | 50 | 21.1 | X | O | 527 | 143 |
| Preparation Example 6 | 390 | 60 | 24.4 | X | O | 540 | 147 |
| Preparation Example 7 | 390 | 70 | 27.4 | X | O | 553 | 150 |
| Preparation Example 8 | 390 | 80 | 30.5 | X | X | Not measurable | |
| Preparation Example 9 | 390 | 90 | 33.3 | X | X | Not measurable | |

Through Table 1, it can be seen that the general glass substrate 10, 21, 22 of Comparative Example 1 has a lower bending strength than commercially available blue glass of Reference Example 1. In addition, in the case of the tempered glass substrates 10, 21, 22 of Preparation Examples 1 to 7, it can be seen that the blade or laser can be cut at the same time, and has an improved bending strength than that of Reference Example 1, which indicates that the thickness ratio of the compressive stress layer 21, 22 to the glass substrate 10, 21, 22 is achieved by satisfying the scope prescribed by present invention. On the other hand, the tempered glass substrates 10, 21, 22 of Preparation Examples 8 to 9 cannot be cut by the blade and the laser, as a result it can be seen that the bending strength is also impossible to be measured. With the contents of Table 1 above, it can be seen that it is suitable for manufacturing a near-infrared absorbing article and an optical filter according to the object of the present invention by utilizing the tempered glass substrate 10, 21, 22 having a thickness range of the compressive stress layer 21, 22 defined in the present invention and/or satisfying the reinforcing condition for manufacturing the tempered glass substrate 10, 21, 22.

Preparation Example 10: Preparation of Tempered Glass Substrate 10, 21, 22 with an Adhesive Layer An adhesive layer 30 was formed on the tempered glass substrate 10, 21, 22 in the following manner:

(1) An adhesive composition composed of a polyacrylic resin is applied to one surface of the tempered glass substrate 10, 21, 22 of Production Example 1 by using a spin coating method.

(2) The resultant of (1) is heat-treated for about 15 minutes at a temperature of 100° C. using an oven to form an adhesive layer 30.

Preparation Examples 11 to 30: Preparation of Tempered Glass Substrate 10, 21, 22 with Adhesive Layer 30

An adhesive layer 30 was formed on the tempered glass substrate 10, 21, 22 as the same manner as in Preparation Example 10 except that the tempered glass substrate 10, 21, 22 applied in the step (1) and/or the heat treatment temperature in the step (2) were adjusted as shown in Table 2 below.

The ratio (B/A) of the bending strength of the tempered glass substrate 10, 21, 22 having the adhesive layer 30 prepared in Preparation Examples 10 to 30 and the bending strength (A) of the tempered glass substrate 10, 21, 22 before the adhesive layer 30 was formed and the bending strength (B) of the glass substrate 10, 21, 22 after the adhesive layer 30 was formed are listed in Table 2 below.

TABLE 2

| Division | Tempered glass | Heat treatment temperature (° C.) | Bending strength (MPa) | Ratio of bending strength |
|---|---|---|---|---|
| Preparation Example 10 | Preparation Example 1 | 100 | 379 | 1.000 |
| Preparation Example 11 | Preparation Example 1 | 120 | 380 | 1.003 |
| Preparation Example 12 | Preparation Example 1 | 140 | 383 | 1.011 |
| Preparation Example 13 | Preparation Example 1 | 160 | 386 | 1.018 |
| Preparation Example 14 | Preparation Example 1 | 180 | 391 | 1.032 |
| Preparation Example 15 | Preparation Example 2 | 100 | 393 | 1.000 |
| Preparation Example 16 | Preparation Example 2 | 120 | 394 | 1.003 |
| Preparation Example 17 | Preparation Example 2 | 140 | 397 | 1.010 |
| Preparation Example 18 | Preparation Example 2 | 160 | 400 | 1.018 |
| Preparation Example 19 | Preparation Example 2 | 180 | 405 | 1.031 |
| Preparation Example 20 | Preparation Example 3 | 100 | 446 | 1.000 |
| Preparation Example 21 | Preparation Example 3 | 120 | 447 | 1.002 |
| Preparation Example 22 | Preparation Example 3 | 140 | 450 | 1.009 |
| Preparation Example 23 | Preparation Example 3 | 160 | 455 | 1.020 |
| Preparation Example 24 | Preparation Example 3 | 180 | 459 | 1.029 |
| Preparation Example 25 | Preparation Example 4 | 100 | 511 | 1.000 |
| Preparation Example 26 | Preparation Example 4 | 120 | 512 | 1.002 |
| Preparation Example 27 | Preparation Example 4 | 140 | 515 | 1.008 |
| Preparation Example 28 | Preparation Example 4 | 150 | 518 | 1.014 |
| Preparation Example 29 | Preparation Example 4 | 160 | 522 | 1.022 |
| Preparation Example 30 | Preparation Example 4 | 180 | 526 | 1.029 |

In Table 2, it can be confirmed that the present invention has improved bending strength when the adhesive layer 30 is formed on the tempered glass substrate 10, 21, 22 at a temperature within the range defined by the present invention.

Specifically, when the conditions for forming the adhesive layer 30 is 100° C. or less, there was no effect of improving the bending strength according to the formation of the adhesive layer 30 and when 180° C. or more, the bending strength was improved by forming the adhesive layer 30, but the adhesive force was lowered and thus, it is not suitable as an adhesive layer 30 for a near-infrared absorbing article.

Embodiment 1: Preparation of Near-Infrared Absorbing Article

A near-infrared absorbing article was prepared by the following procedure:

(1) A composition for forming a light absorbing layer 40 is manufactured by mixing a cyanine-based dye having an absorbing maximum in the wavelength range of 700 nm to 800 nm and a squarylium-based dye having an absorbing maximum in the wavelength range of 1,000 nm to 1,100 nm with a cyclic olefin resin is applied by a spin coating method on a tempered glass substrate 10, 21, 22 further with an adhesive layer 30 as stated in Preparation Example 11.

(2) The resultant of (1) is heat-treated in an oven at a temperature of 100° C. for 4 hours to form a light absorbing layer 40. As a result, a near-infrared absorbing article having the light absorbing layer 40 attached to one surface of the tempered glass substrate 10, 21, 22 via the adhesive layer 30 was prepared.

Figure 4:
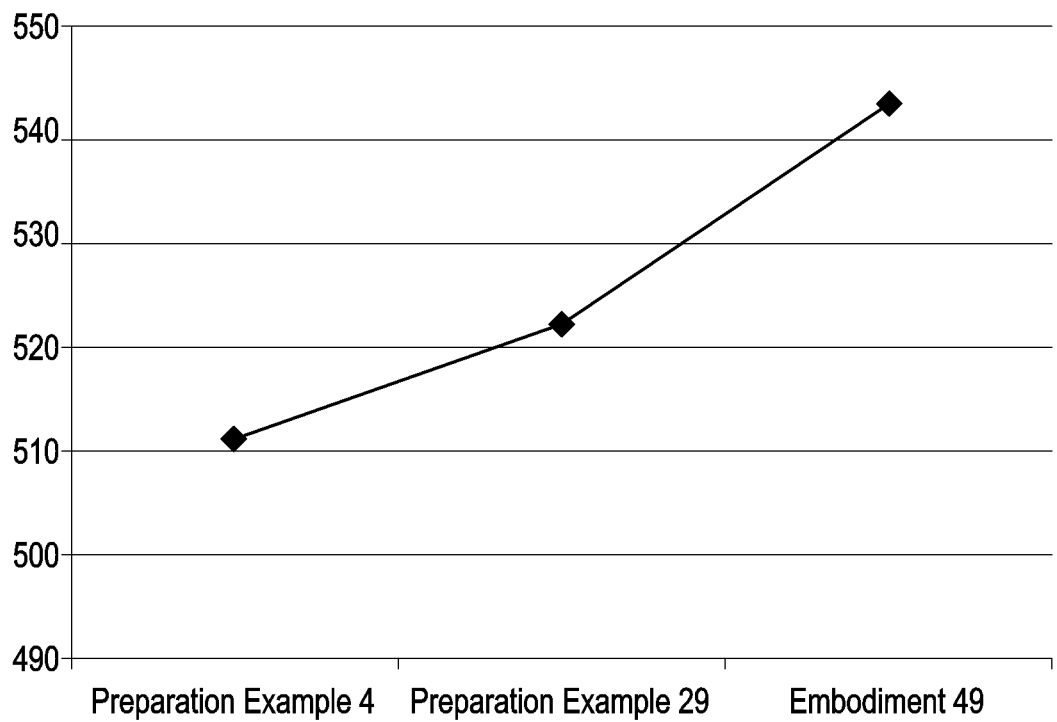
FIG. 4 is a graph of the three-point bending strength measurement results for Preparation Example 4, Preparation Example 29 and Embodiment 49 of the present invention.

Embodiments 2 to 49 and Comparative Examples 2 to 25: Preparation of Near-Infrared Absorbing Article Near-infrared absorbing articles were prepared in the same manner as in Embodiment 1, except that the type of tempered glass substrate 10, 21, 22 having the adhesive layer 30 applied in step (1) and the heat treatment temperature in step (2) were adjusted as shown in Tables 3 to 5 below. In addition, the ratio (C/D) of the bending strength (C) measured for the near-infrared absorbing article and the bending strength (D) of the tempered glass substrate 10, 21, 22 on which the adhesive layer 30 was formed is shown in Tables 3 to 5 below. In addition, the graph of the three-point bending strength measurement results of Preparation Example 4, Preparation Example 29 and Embodiment 49 of the present invention is shown in FIG. 4.

TABLE 3

| Division | Tempered glass on which adhesive layer is formed | Heat treatment temperature (° C.) | Bending strength (MPa) | Ratio of bending strength |
|---|---|---|---|---|
| Comparative Example 2 | Preparation Example 11 | 80 | 380 | 1.000 |
| Embodiment 1 | Preparation Example 11 | 100 | 381 | 1.003 |
| Embodiment 2 | Preparation Example 11 | 120 | 383 | 1.008 |
| Embodiment 3 | Preparation Example 11 | 140 | 389 | 1.024 |
| Embodiment 4 | Preparation Example 11 | 160 | 393 | 1.034 |
| Comparative Example 3 | Preparation Example 11 | 180 | 399 | 1.050 |
| Comparative Example 4 | Preparation Example 11 | 80 | 383 | 1.000 |
| Embodiment 5 | Preparation Example 12 | 100 | 384 | 1.003 |
| Embodiment 6 | Preparation Example 12 | 120 | 387 | 1.010 |
| Embodiment 7 | Preparation Example 12 | 140 | 393 | 1.026 |
| Embodiment 8 | Preparation Example 12 | 160 | 397 | 1.037 |
| Comparative Example 5 | Preparation Example 12 | 180 | 403 | 1.052 |
| Comparative Example 6 | Preparation Example 12 | 80 | 386 | 1.000 |
| Embodiment 9 | Preparation Example 13 | 100 | 387 | 1.003 |
| Embodiment 10 | Preparation Example 13 | 120 | 390 | 1.010 |
| Embodiment 11 | Preparation Example 13 | 140 | 396 | 1.026 |
| Embodiment 12 | Preparation Example 13 | 160 | 400 | 1.036 |
| Comparative Example 7 | Preparation Example 13 | 180 | 406 | 1.052 |
| Comparative Example 8 | Preparation Example 16 | 80 | 394 | 1.000 |
| Embodiment 13 | Preparation Example 16 | 100 | 395 | 1.000 |
| Embodiment 14 | Preparation Example 16 | 120 | 398 | 1.010 |
| Embodiment 15 | Preparation Example 16 | 140 | 405 | 1.028 |
| Embodiment 16 | Preparation Example 16 | 160 | 410 | 1.041 |
| Comparative Example 9 | Preparation Example 16 | 180 | 414 | 1.051 |

TABLE 4

| Division | Tempered glass on which adhesive layer is formed | Heat treatment temperature (° C.) | Bending strength (MPa) | Ratio of bending strength |
|---|---|---|---|---|
| Comparative Example 10 | Preparation Example 17 | 80 | 397 | 1.000 |
| Embodiment 17 | Preparation Example 17 | 100 | 398 | 1.003 |
| Embodiment 18 | Preparation Example 17 | 120 | 401 | 1.010 |
| Embodiment 19 | Preparation Example 17 | 140 | 408 | 1.028 |
| Embodiment 20 | Preparation Example 17 | 160 | 413 | 1.040 |
| Comparative Example 11 | Preparation Example 17 | 180 | 419 | 1.055 |
| Comparative Example 12 | Preparation Example 18 | 80 | 400 | 1.000 |
| Embodiment 21 | Preparation Example 18 | 100 | 401 | 1.003 |
| Embodiment 22 | Preparation Example 18 | 120 | 404 | 1.010 |
| Embodiment 23 | Preparation Example 18 | 140 | 412 | 1.030 |
| Embodiment 24 | Preparation Example 18 | 160 | 416 | 1.040 |
| Comparative Example 13 | Preparation Example 18 | 180 | 422 | 1.055 |
| Comparative Example 14 | Preparation Example 21 | 80 | 447 | 1.000 |
| Embodiment 25 | Preparation Example 21 | 100 | 448 | 1.002 |
| Embodiment 26 | Preparation Example 21 | 120 | 451 | 1.009 |
| Embodiment 27 | Preparation Example 21 | 140 | 460 | 1.029 |
| Embodiment 28 | Preparation Example 21 | 160 | 465 | 1.040 |
| Comparative Example 15 | Preparation Example 21 | 180 | 473 | 1.058 |
| Comparative Example 16 | Preparation Example 22 | 80 | 450 | 1.000 |
| Embodiment 29 | Preparation Example 22 | 100 | 451 | 1.002 |
| Embodiment 30 | Preparation Example 22 | 120 | 455 | 1.011 |
| Embodiment 31 | Preparation Example 22 | 140 | 463 | 1.029 |
| Embodiment 32 | Preparation Example 22 | 160 | 468 | 1.040 |
| Comparative Example 17 | Preparation Example 22 | 180 | 475 | 1.056 |

TABLE 5

| Division | Tempered glass on which adhesive layer is formed | Heat treatment temperature (° C.) | Bending strength (MPa) | Ratio of bending strength |
|---|---|---|---|---|
| Comparative Example 18 | Preparation Example 23 | 80 | 455 | 1.000 |
| Embodiment 33 | Preparation Example 23 | 100 | 456 | 1.002 |
| Embodiment 34 | Preparation Example 23 | 120 | 460 | 1.011 |
| Embodiment 35 | Preparation Example 23 | 140 | 468 | 1.029 |
| Embodiment 36 | Preparation Example 23 | 160 | 474 | 1.042 |
| Comparative Example 19 | Preparation Example 23 | 180 | 480 | 1.055 |
| Comparative Example 20 | Preparation Example 26 | 80 | 512 | 1.000 |
| Embodiment 37 | Preparation Example 26 | 100 | 513 | 1.002 |

TABLE 5-continued

| Division | Tempered glass on which adhesive layer is formed | Heat treatment temperature (° C.) | Bending strength (MPa) | Ratio of bending strength |
|---|---|---|---|---|
| Embodiment 38 | Preparation Example 26 | 120 | 516 | 1.008 |
| Embodiment 39 | Preparation Example 26 | 140 | 525 | 1.025 |
| Embodiment 40 | Preparation Example 26 | 160 | 531 | 1.037 |
| Comparative Example 21 | Preparation Example 26 | 180 | 540 | 1.055 |
| Comparative Example 22 | Preparation Example 27 | 80 | 515 | 1.000 |
| Embodiment 41 | Preparation Example 27 | 100 | 516 | 1.002 |
| Embodiment 42 | Preparation Example 27 | 120 | 520 | 1.010 |
| Embodiment 43 | Preparation Example 27 | 140 | 531 | 1.031 |
| Embodiment 44 | Preparation Example 27 | 160 | 535 | 1.039 |
| Comparative Example 23 | Preparation Example 27 | 180 | 543 | 1.054 |
| Embodiment 45 | Preparation Example 28 | 140 | 534 | 1.031 |
| Comparative Example 24 | Preparation Example 29 | 80 | 522 | 1.000 |
| Embodiment 46 | Preparation Example 29 | 100 | 523 | 1.002 |
| Embodiment 47 | Preparation Example 29 | 120 | 527 | 1.010 |
| Embodiment 48 | Preparation Example 29 | 140 | 537 | 1.029 |
| Embodiment 49 | Preparation Example 29 | 160 | 543 | 1.040 |
| Comparative Example 25 | Preparation Example 29 | 180 | 548 | 1.050 |

Through Tables 3 to 5, if the temperature conditions for forming the light absorbing layer 40 is within the temperature range specified in the present invention, it can be seen that it is more advantageous for manufacturing a near-infrared absorbing article having an improved bending strength compared to the tempered glass substrate 10, 21, 22 on which the adhesive layer 30 is formed.

Specifically, when the temperature condition for forming the light absorbing layer 40 is 80° C. or less, the effect of improving the bending strength depending on the formation of the light absorbing layer 40 is insignificant, and when the temperature is 180° C. or higher, the bending strength depending on the formation of the light absorbing layer 40 is improved, but it is confirmed that the visible light region transmittance (the wavelength in the range of 400 nm to 700 nm) is decreased and the absorbance of the near infrared region (wavelength of 700 nm or more) is also decreased, thus, it is not preferable to use as the light absorbing layer 40 for the present invention.

In FIG. 4, it can be seen that the bending strength is gradually increased when the adhesive layer 30 is formed on the tempered glass substrate 10, 21, 22 and then the light absorbing layer 40 is formed under the temperature conditions defined in the scope of the present invention.

Embodiment 50: Preparation of Infrared Cut-Off Filter (Optical Filter)

An infrared cut-off filter was manufactured in the following manner:

(1) A first selective wavelength reflecting layer 51, 52 having a dielectric film composed of titanium dioxide (high refractive index layer, refractive index at a wavelength of 550 nm: 2.32) and a dielectric film composed of silicon dioxide (low refractive index at the wavelength of 550 nm: 1.46) is formed on on one surface of the near-infrared absorbing article of Embodiment 45 by using a known deposition method as being alternatively stacked with 15 layers in total and the thickness about 1.95 μm.

(2) A second selective wavelength reflecting layer 51, 52 having a dielectric film composed of titanium dioxide (high refractive index layer, refractive index at a wavelength of 550 nm: 2.32) and a dielectric film composed of silicon dioxide (low refractive index at the wavelength of 550 nm: 1.46) is formed on on the opposite surface of the near-infrared absorbing article by using a known deposition method as being alternatively stacked with 23 layers in total and the thickness about 2.51 μm. The manufactured infrared cut-off filter had a thickness of about 108.14 μm and measured three-point bending strength was about 535 MPa.

Comparative Example 26: Preparation of Infrared Cut-Off Filter

An infrared cut-off filter was manufactured in the following manner:

A first selective wavelength reflecting layer 51, 52 having a dielectric film composed of titanium dioxide (high refractive index layer, refractive index at a wavelength of 550 nm: 2.32) and a dielectric film composed of silicon dioxide (low refractive index at the wavelength of 550 nm: 1.46) is formed on on one surface of a blue glass in Comparative Example 1 by using a known deposition method as being alternatively stacked with 17 layers in total and the thickness about 2.24 μm.

(2) A second selective wavelength reflecting layer 51, 52 having a dielectric film composed of titanium dioxide (high refractive index layer, refractive index at a wavelength of 550 nm: 2.32) and a dielectric film composed of silicon dioxide (low refractive index at the wavelength of 550 nm: 1.46) is formed on on the opposite surface of the near-infrared absorbing article where the first selective wavelength reflecting layer 51, 52 is formed by using a known deposition method as being alternatively stacked with 23 layers in total and the thickness about 2.43 μm.

The manufactured infrared cut-off filter had a thickness of approximately 214.67 μm and measured three point bending strength was about 370 MPa.

Through Embodiment 50 and Comparative Example 26, it can be seen that the optical filter of the present invention is about half the thickness but its bending strength is increased approximately 1.44 times over the compared optical filter which uses a conventional blue glass.

Thus, the present invention is possible to provide a near-infrared article having its advantage as being thinner while maintaining higher strength over the conventional.

Furthermore, the present invention is possible to provide an advantage for easy manufacturing of the near-infrared article over the conventional one because the near-infrared absorbing plate contains a glass substrate 10, 21, 22 including a compressive stress layer 21, 22 having a predetermined thickness thus to provide a thin thickness and a certain level of strength or more and thereby the glass substrate 10, 21, 22 is cuttable by a blade or a laser.

What is claimed is:

1. A near-infrared absorbing article comprising:
   a glass substrate; and
   a light absorbing layer formed on one side or both sides of the glass substrate, wherein the glass substrate comprises a first compressive stress layer formed on a first main surface of the glass substrate and a second compressive stress layer formed on a second main surface opposite to the first main surface of the glass substrate, wherein an average thickness of the glass substrate is 0.07 mm to 0.12 mm, wherein a three-point bending strength of the near-infrared absorbing article is 360 MPa or more when the glass substrate is measured with reference to the standard ASTM D790, wherein the light absorbing layer is different from the first compressive stress layer and the second compressive stress layer, wherein an average thickness of the first compressive stress layer and an average thickness of the second compressive stress layer are greater than 1 μm and less than 10 μm, wherein an average thickness of the light absorbing layer is in a range of 0.5 μm to 10 μm, wherein the light absorbing layer is a resin composition having a light absorbing agent, and the light absorbing agent is 0.001 parts by weight to 10 parts by weight based on 100 parts by weight of the resin composition, and wherein the light absorbing layer is formed by a heat treatment for 2 hours to 5 hours at a temperature in a range of 100° C. to 160° C.

2. The near-infrared absorbing article of claim 1, wherein a combined average thickness of a thickness of the glass substrate and a thickness of the light absorbing layer is in a range of 0.08 mm to 0.13 mm.

3. The near-infrared absorbing article of claim 1, further comprising:
an adhesive layer between the glass substrate and the light absorbing layer.

4. An optical filter comprising:
a near-infrared absorbing article including a glass substrate;
a light absorbing layer formed on one side or both sides of the glass substrate; and
a selective wavelength reflecting layer formed on one or both sides of the near-infrared absorbing article, wherein the glass substrate comprises a first compressive stress layer formed on a first main surface of the glass substrate and a second compressive stress layer formed on a second main surface opposite to the first main surface of the glass substrate, wherein an average thickness of the glass substrate is 0.07 mm to 0.12 mm, wherein a three-point bending strength of the near-infrared absorbing article is 360 MPa or more when the glass substrate is measured with reference to the standard ASTM D790, wherein an average thickness of the first compressive stress layer and an average thickness of the second compressive stress layer are greater than 1 μm and less than 10 μm, wherein the light absorbing layer is different from the first compressive stress layer and the second compressive stress layer, and an average thickness of the light absorbing layer is in a range of 0.5 μm to 10 μm, wherein the light absorbing layer is a resin composition having a light absorbing agent, and the light absorbing agent is 0.001 parts by weight to 10 parts by weight based on 100 parts by weight of the resin composition, and wherein the light absorbing layer is formed by a heat treatment for 2 hours to 5 hours at a temperature in a range of 100° C. to 160° C.

5. The optical filter of claim 4, further comprising:
a dielectric multilayer film formed to construct the selective wavelength reflecting layer.

6. The optical filter of claim 4, further comprising:
a dielectric film having a refractive index of 1.4 to 1.6; and
a dielectric film having a refractive index of 2.1 to 2.5,
wherein the dielectric film having a refractive index of 1.4 to 1.6 and the dielectric film having a refractive index of 2.1 to 2.5 are alternately stacked to construct the selective wavelength reflecting layer.

* * * * *